Aug. 14, 1928.

E. HARRIS 1,680,878

SELF SETTING MOUSE AND RAT TRAP

Filed Aug. 11, 1927

INVENTOR,
Elbert Harris.

Sterling P. Buck,
ATTORNEY.

Patented Aug. 14, 1928.

1,680,878

UNITED STATES PATENT OFFICE.

ELBERT HARRIS, OF CHARLOTTESVILLE, VIRGINIA.

SELF-SETTING MOUSE AND RAT TRAP.

Application filed August 11, 1927. Serial No. 212,309.

This invention relates to animal traps, and especially to an improved form of self-setting mouse and rat trap.

One object of this invention is to provide a trap-device which is attachable to the glass body or receptacle of a fruit-jar of well known form such, for instance, as that of a "Mason jar".

A further object is to provide a trap-device of this character which automatically opens in consequence of the entrance of a mouse or rat into the compartment which constitutes the anteroom of the trap, and which opens sufficiently far to permit a large rat to pass from the anteroom into the main room or chamber formed by the glass jar.

A further object is to provide a device of this character which operates without the use of any spring for returning the closure or trap-door of the anteroom to its closed position.

Other objects and important features are pointed out or implied in the following details of description, in connection with the accompanying drawings in which.

Figure 1:
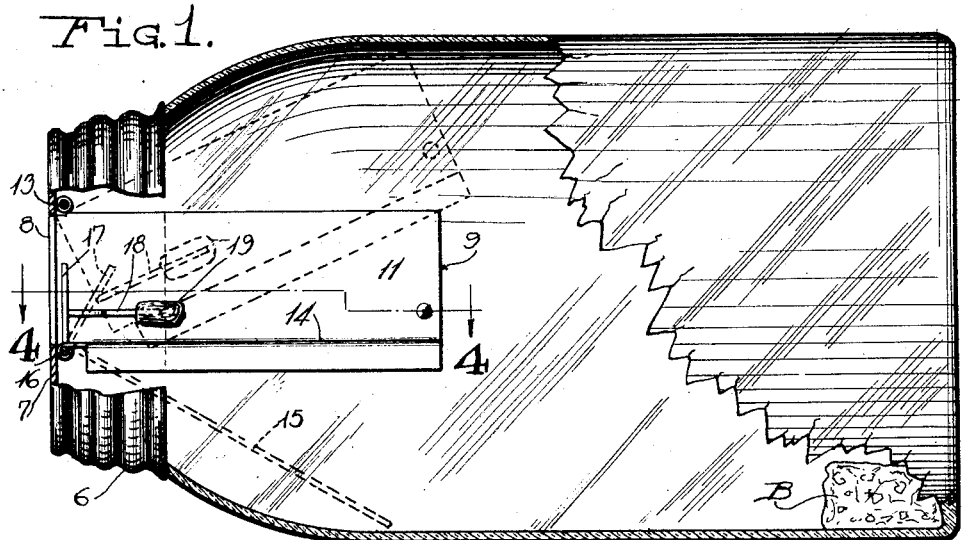
Fig. 1 is a view partly in side elevation and partly in central, vertical and longitudinal section, the open position of the vestibule being shown in dotted lines.
Figures 2, 3:
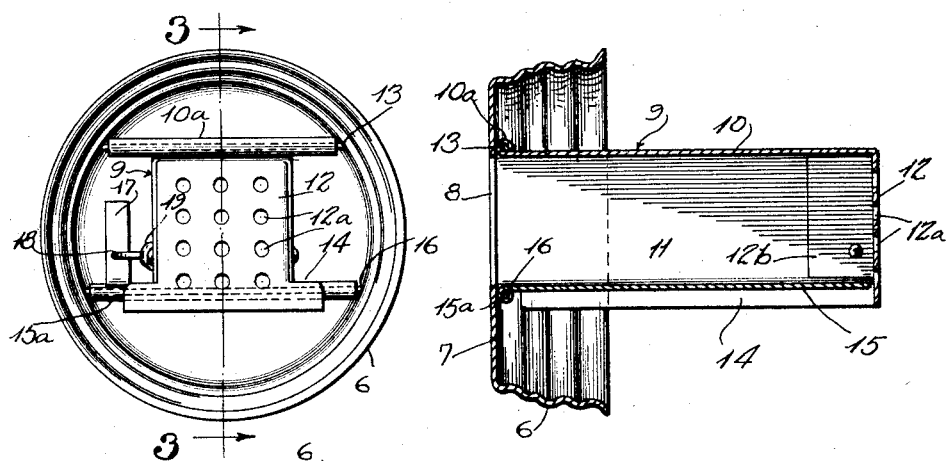
Fig. 2 is a right-end view or inner-end view of the trap-device detached from the glass jar body.
Fig. 3 is a sectional view along the line 3—3 of Figure 2.
Figure 4:
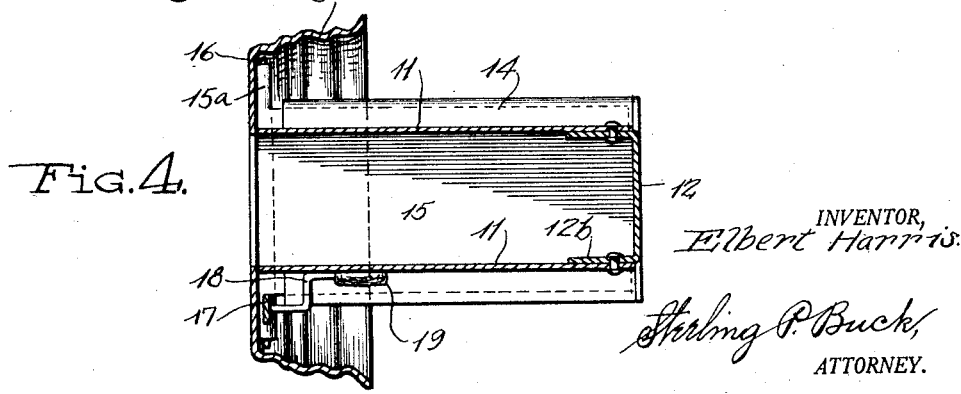
Fig. 4 is a sectional view along the line 4—4 of Figure 1.

Referring to these drawings in detail, in which similar reference characters correspond to similar parts throughout the several views, and in which the glass jar body 5 is of ordinary construction, provided with an externally threaded mouth (not shown) onto which the cap or cover 6 screws in a well known manner, the invention will now be described in detail as follows:

The disk 7 of the cap 6 is provided with an opening 8, preferably rectangular and in the center of the disk, this opening being large enough to receive a large rat. An inverted U-shaped body 9 comprises a roof 10, walls 11 and a perforated inner end wall 12. The perforations 12a of said wall serve to permit odors to pass therethrough from any appropriate bait B in the glass receptacle or room 5. This body 9 is pivotally mounted at 13, in the cap 6, so its open outer end normally abuts against the disk 7, and is thus held in the horizontal position shown in full lines in all of the figures of drawings. The walls 11 are formed with outwardly and downwardly extending flanges 14 between which and against which a closure or trap-door 15 is normally held by means of its supporting pivot 16, an arm or abutment 17, and an arm or abutment 18, the latter being soldered or otherwise secured on one of the walls 11 of the anteroom 9 at 19. The arm or abutment 18 rests against the arm or abutment 17 in such relation as to normally hold the trap-door 15 closed against the flanges 14 when the device is not operating; but when an animal of sufficient weight enters the opening 8 and approaches the perforated wall 12, the weight of such animal combines with the leverage of the members 15—17, so as to raise the member 9 to the dotted line position, thereby providing a wide opening at the inner end and sides of the anteroom, through which the animal may feel safe in entering the main compartment containing the bait. Soon as the trap-door 15 is relieved from the weight of the animal, the weight of the member 9, in pressing the abutment 18 against the abutment 17, raises the trap-door into the closed position between the depending parts of the flanges 14, so the animal can not gain access to the edges of the trap door and thereby open the same. In this connection, however, it should be understood that the wall 12 extends down to the lower edges of the flanges 14, as clearly shown in Figures 2 and 3, to cooperate with such flanges 14 in preventing the animal from opening the trap-door.

In order that this device may be manufactured at the minimum cost, I have shown the part 9 formed of a single blank of sheet metal, portions of which blank form the top 10, side walls 11 with their depending and horizontally extending flanges 14, and end wall 12 which has angular extensions 12b lying against the walls 11 and secured thereto by rivets or other appropriate means. The member 9 also includes a cylindrical portion 10a which constitutes the bearing for the pivot 13.

The trap-door 15 is formed integrally with a cylindrical bearing 15a which receives the pivot 16, and the arm 17 is also preferably formed integrally with the parts 15 and 15a of a single blank of sheet metal. The pintles or pivots 13 and 16 have their ends secured to the member 6 by any appropriate means, but preferably by means of openings (not shown) through which the ends of the pivots extend, and in which they may be soldered or otherwise secured.

Although I have described this very practical form of my invention specifically, it is not my intention to limit my patent protection to these specific and exact details of description, but changes may be made within the scope of the inventive ideas as implied and claimed.

What I claim as my invention is:

1. In an animal trap, the combination of a main chamber having an opening therein, and an anteroom including a pivotally mounted part within the said main chamber and having an opening in communication with the first said opening and being provided with a trap-door and with means to normally hold the trap-door closed, said means including the pivot on which said pivotally mounted part of the anteroom is mounted, said trap-door being yieldably mounted for depression by an animal thereon and being operably mounted to swing the said pivotally mounted part of the anteroom upward and thereby provide a large opening through which the animal can pass from the anteroom into said main chamber, the weight of said pivotally mounted part being effective to raise said trap-door to its closed position.

2. The structure defined by claim 1, and said pivotally mounted part being provided with means to limit the upward movement of the trap-door and to shield the edges of the trap-door against access by a trapped animal which might try to open the door.

3. The structure defined by claim 1, said trap-door being pivotally mounted and provided with an upstanding abutment, and the first said pivotally mounted part being provided with an abutment which cooperates with the first said abutment for holding the trap-door closed while permitting the trap-door to be depressed and to raise the first said pivotally mounted member.

4. The structure defined by claim 1, said pivotally mounted member including an end wall and side wall and a pivot-bearing and laterally and downwardly extending flanges all integrally formed of a blank of sheet metal, substantially as described.

5. The structure defined by claim 1, said main chamber including a glass jar-body and a cap which includes a disk having the first said opening therethrough, the said pivotally mounted part of the anteroom having its pivot secured to said cap, the said trap-door being pivotally mounted in said cap at a side of the opening opposite to the first said pivot.

In testimony whereof I affix my signature.

ELBERT HARRIS.